US010704405B2

(12) United States Patent
Pakkala et al.

(10) Patent No.: US 10,704,405 B2
(45) Date of Patent: Jul. 7, 2020

(54) APPARATUS AND METHOD FOR SEALING TURBINE ASSEMBLY

(71) Applicant: General Electric Company, Schenectady, NY (US)

(72) Inventors: Srinivas Pakkala, Chintalapudi (IN); Robert Jamiolkowski, Warsaw (PL); Tomasz Jendrzejewski, Warsaw (PL); Rohit Pruthi, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 590 days.

(21) Appl. No.: 15/301,659

(22) PCT Filed: Apr. 2, 2014

(86) PCT No.: PCT/PL2014/000035
§ 371 (c)(1),
(2) Date: Oct. 3, 2016

(87) PCT Pub. No.: WO2015/152742
PCT Pub. Date: Oct. 8, 2015

(65) Prior Publication Data
US 2017/0114654 A1    Apr. 27, 2017

(51) Int. Cl.
F01D 11/00    (2006.01)
F01D 25/24    (2006.01)
(Continued)

(52) U.S. Cl.
CPC .............. F01D 11/005 (2013.01); F01D 5/02 (2013.01); F01D 9/02 (2013.01); F01D 11/00 (2013.01);
(Continued)

(58) Field of Classification Search
CPC .... F02C 7/28; F01D 9/023; F01D 11/00–005; F01D 25/24; F01D 25/243;
(Continued)

(56) References Cited

U.S. PATENT DOCUMENTS 2,352,583 A    6/1944 Zetterquist
4,020,971 A    5/1977 Östbo
(Continued)

FOREIGN PATENT DOCUMENTS

CN    1853032 A    10/2006
DE    39 41 089 A1    6/1990
(Continued)

OTHER PUBLICATIONS

Oct. 31, 2014 International Search Report issued in PCT No. PCT/PL2014/000035.
(Continued)

Primary Examiner — Jason H Duger
(74) Attorney, Agent, or Firm — Nixon & Vanderhye P.C.

(57) ABSTRACT

A turbine or turbine system includes a compressor, a combustor, a turbine section, a diffuser with a parting line between two components, and a seal along the parting line. The seal includes a protrusion, a recess, and a flexible portion between the protrusion and the recess. The flexible portion has a bent cross-section perpendicular to the parting line. An outer surface of the bent cross-section contacts an inner surface of the recess. An inner surface of the bent cross-section contacts an outer surface of the protrusion. Sealing a parting line between two parts of a diffuser in a gas turbine system includes disposing a flexible portion between a protrusion and a recess of the two parts, contacting an outer surface of the bent cross-section with an inner surface of the
(Continued)

recess, contacting an inner surface of the bent cross-section with an outer surface of the protrusion, and pressurizing the diffuser.

11 Claims, 5 Drawing Sheets

(51) Int. Cl.
*F01D 25/30* (2006.01)
*F01D 5/02* (2006.01)
*F01D 9/02* (2006.01)
*F02C 3/04* (2006.01)

(52) U.S. Cl.
CPC ............ *F01D 11/003* (2013.01); *F01D 25/24* (2013.01); *F01D 25/243* (2013.01); *F01D 25/30* (2013.01); *F02C 3/04* (2013.01); *F05D 2220/32* (2013.01); *F05D 2240/35* (2013.01); *F05D 2240/55* (2013.01); *Y02T 50/671* (2013.01)

(58) Field of Classification Search
CPC ...................... F01D 25/28; F01D 25/30; F05D 2240/55–59; F02K 1/805; F16J 9/22; F16J 9/24; F16J 15/46; F16J 15/48
See application file for complete search history.

(56) References Cited

U.S. PATENT DOCUMENTS

| | | | |
|---|---|---|---|
| 4,503,668 A | 3/1985 | Duncan, III et al. | |
| 5,076,591 A | 12/1991 | Gentile | |
| 5,503,051 A | 4/1996 | Stauber | |
| 6,971,844 B2 | 12/2005 | Burdgick | |
| 8,915,707 B2* | 12/2014 | Bruhwiler | F01D 9/044 |
| | | | 415/215.1 |
| 10,280,778 B2* | 5/2019 | Rogers | F02C 7/28 |

FOREIGN PATENT DOCUMENTS

| | | |
|---|---|---|
| EP | 1 515 003 A1 | 3/2005 |
| EP | 2 653 663 A2 | 10/2013 |
| FR | 2 268 204 A1 | 11/1975 |
| GB | 2 087 501 A | 5/1982 |
| JP | 2007-120340 | 5/2007 |
| JP | 2009-24631 | 2/2009 |
| JP | 2014-001693 | 1/2014 |
| WO | WO 2008/033897 A1 | 3/2008 |

OTHER PUBLICATIONS

Oct. 31, 2014 Written Opinion issued in PCT No. PCT/PL2014/000035.

* cited by examiner

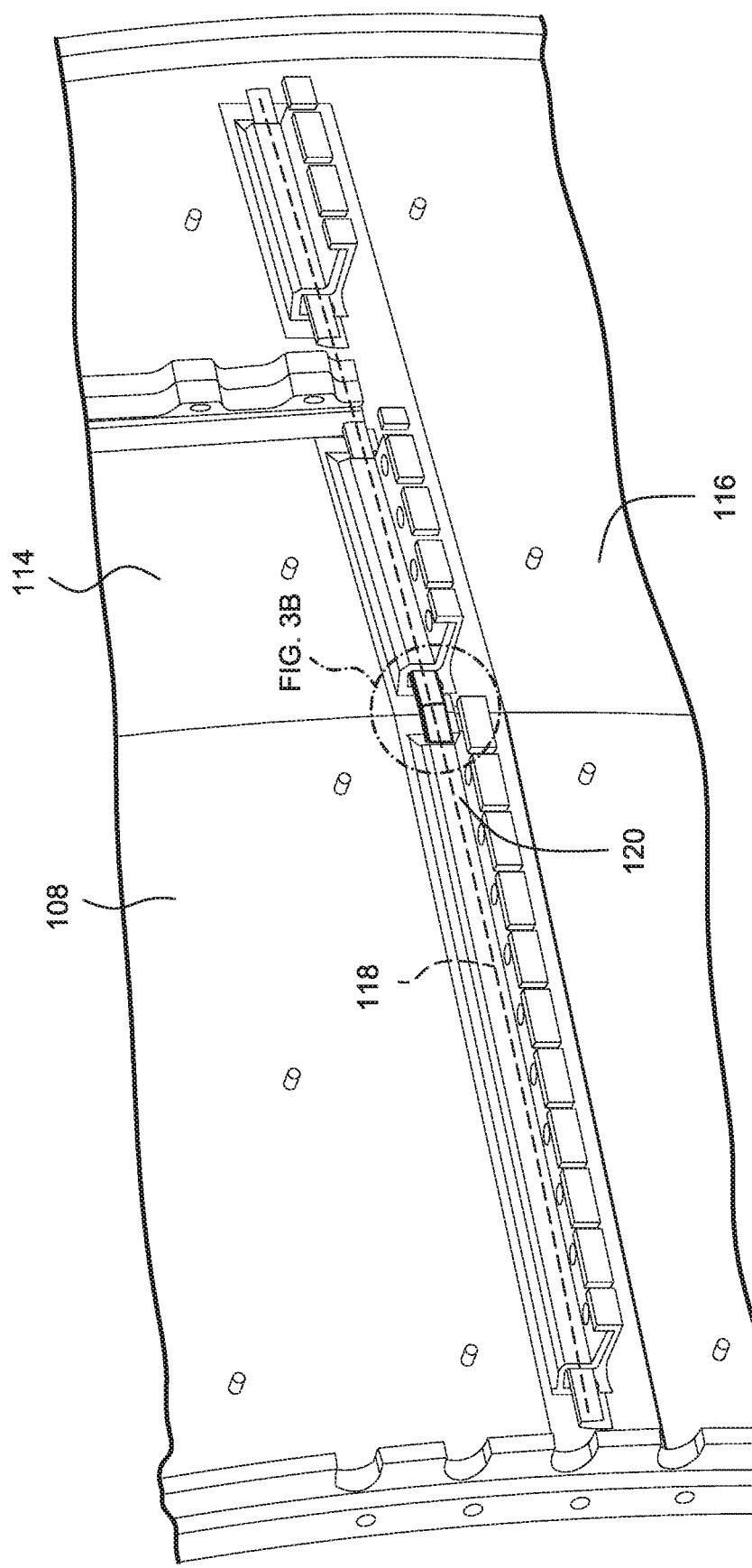

APPARATUS AND METHOD FOR SEALING TURBINE ASSEMBLY

The subject matter disclosed herein relates to apparatus and methods of sealing an assembly. In particular, the apparatus and methods relate to providing a seal along a parting line between two components of a turbine assembly.

BACKGROUND OF THE INVENTION

Due to considerations such as ease of manufacturing or need for maintenance, components of a power plant assembly may be broken into sub-components that are joined to one another in a removable manner. A so-called parting line is formed where the sub-components come close to or contact one another and are separable from one another and may include a seal disposed between the components. When there is a differential pressure related to the sub-component, be it a differential pressure from interior to exterior, exterior to interior, or within the sub-component, there may be a tendency for the differential pressure to result in a flow across the parting line if the parting line is not adequately sealed.

Providing a seal across the parting line may be challenging if the sub-components encounter temperature changes or temperature gradients in service. For example, if the sub-components have a service temperature of several hundred, or even thousand, degrees Fahrenheit, the sub-components could undergo considerable thermal expansion as the sub-components reach operating temperature. This could cause dimensional changes along the parting line and such dimensional changes could change the characteristics of any seal along the parting line as the sub-components transition to the operating temperature. Even once the sub-components reach a steady state or semi-steady state operating temperature, a temperature gradient along the parting line could cause a seal to have different sealing characteristics along the temperature gradient. Even small dimensional variances along a parting line could result in considerable changes to sealing performance such that the seal becomes non-deterministic due to dimensional variances of the seal which can make prediction of where components contact one another, and/or where the components contact a seal, difficult.

Varying sealing characteristics may be of particular concern in turbines where efficiency is of particular importance. For example, even though leaks could be accounted for or even desirable, being able to model or predict the leaks is useful to control or measure the performance of the turbine. A particular component that may include such a parting line and/or seal is a diffuser in a turbine.

BRIEF DESCRIPTION OF THE INVENTION

Aspects of the apparatus and methods for sealing a turbine assembly described herein provide solutions to one or more problems or disadvantages associated with the prior art.

In one exemplary but non-limiting aspect, the present disclosure relates to a turbine system comprising: a compressor section; a combustion section; a turbine section; a diffuser with a parting line between two components of the diffuser; and a seal along the parting line. The seal comprises a protruding portion, a recessed portion, and a flexible portion between the protruding portion and the recessed portion. The flexible portion has a bent cross-section when viewed perpendicular to the parting line. An outer surface of the bent cross-section contacts an inner surface of the recessed portion, and an inner surface of the bent cross-section contacts an outer surface of the protruding portion.

In another exemplary but non-limiting aspect, the present disclosure relates to a power plant comprising: a turbine system; a mechanical or electrical load; an inlet system; and a control system. The turbine system comprises a compressor section, a combustion section, a turbine section, a diffuser with a parting line between two components of the diffuser, and a seal along the parting line. The seal comprises a protruding portion, a recessed portion, and a flexible portion between the protruding portion and the recessed portion. The flexible portion has a bent cross-section when viewed perpendicular to the parting line, an outer surface of the bent cross-section contacts an inner surface of the recessed portion, and an inner surface of the bent cross-section contacts an outer surface of the protruding portion In another exemplary but non-limiting aspect, the present disclosure relates to a turbine comprising a first diffuser component; a second diffuser component; a parting line between the first diffuser component and the second diffuser component; and a seal along the parting line. The seal comprises, in cross-section, a convex portion, a concave portion, and a flexible portion between the convex portion and the concave portion. The flexible portion has a bent cross-section when viewed perpendicular to the parting line, the bent cross-section has a fixed end and a free end, an outer surface of the bent cross-section contacts an inner surface of the concave portion near the free end, and an inner surface of the bent cross-section contacts an outer surface of the convex portion near the fixed end.

BRIEF DESCRIPTION OF THE DRAWINGS

FIG. 3A is a detailed view of a parting line and associated seal where two components of the diffuser mate;

DETAILED DESCRIPTION OF THE INVENTION

Figure 1:
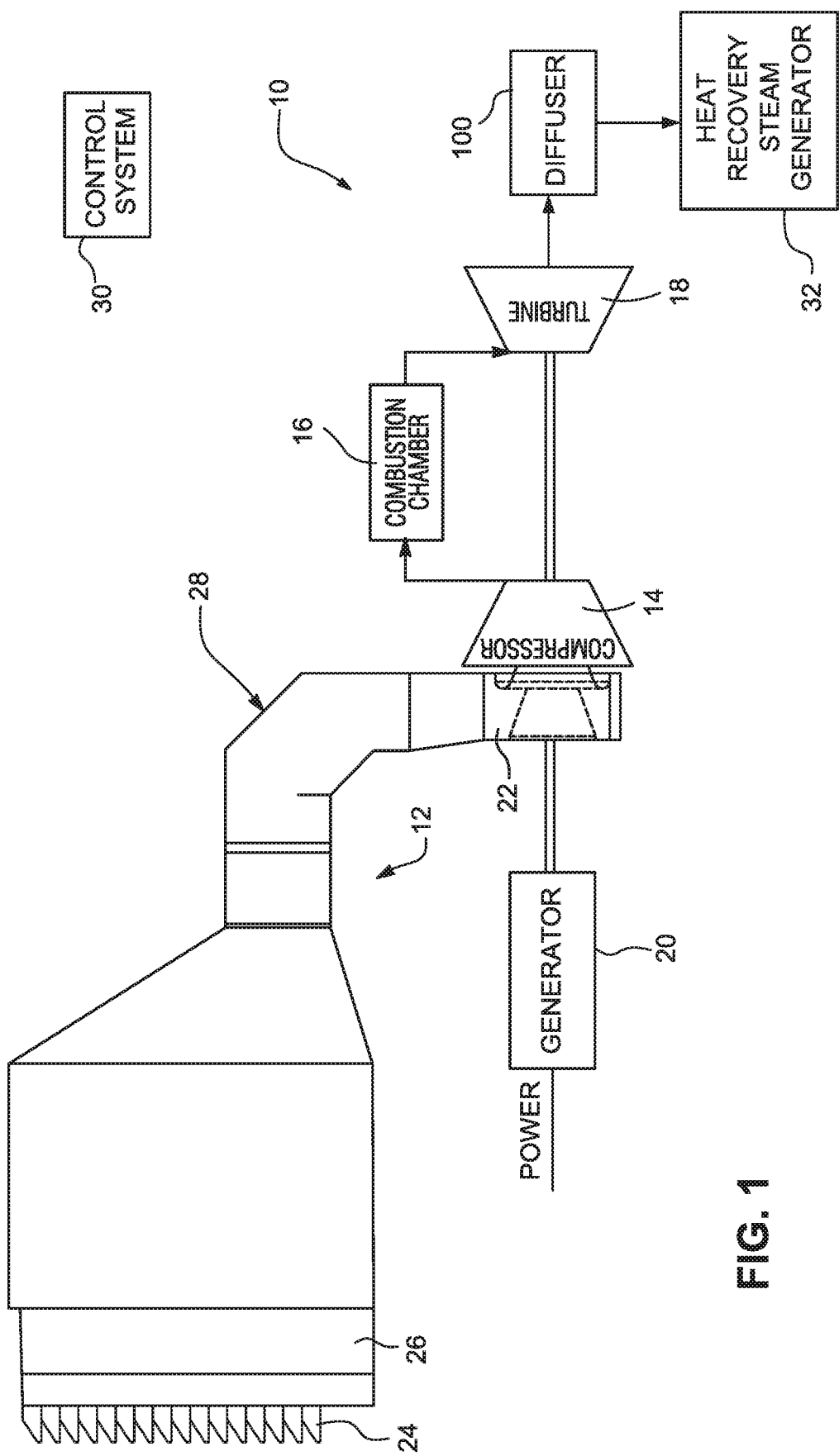
FIG. 1 is a schematic representation of a turbine engine system.

One or more specific embodiments of the present disclosure will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present disclosure may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present disclosure.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "horizontal", "vertical", "upstream", "downstream", "forward", "aft", and the like; merely describe the configuration shown in the figures. Indeed, the element or elements of an embodiment of the present disclosure may be oriented in any direction and the terminology, therefore, should be understood as encompassing such variations unless specified otherwise.

As used throughout the specification and claims, "substantially" and "about" include at least deviations from ideal or nominal values that are within manufacturing, operational and/or inspection tolerances.

The present disclosure may be applied to the variety of gas turbine engines that compress an ingested air, such as, but not limiting to, a heavy-duty gas turbine; an aero-derivative gas turbine; or the like. An embodiment of the present disclosure may be applied to either a single gas turbine engine or a plurality of gas turbine engines. An embodiment of the present disclosure may be applied to a gas turbine engine operating in a simple cycle or combined cycle.

FIG. 1 illustrates a gas turbine engine 10 with an inlet system 12. The gas turbine engine 10 generally comprises a compressor 14, at least one combustor having a combustion chamber 16 and a turbine section 18. In land-based gas turbines, the turbine section 18 typically drives a mechanical or electrical load such as a generator 20. The compressor 14 is provided with an inlet that may include a plurality of inlet guide vanes (not shown) arranged downstream of an inlet plenum 22. The turbine section 18 is fluidly connected to a diffuser 100 which is connected to a heat recovery steam generator 32. The inlet system 12 generally comprises a weather hood 24 mounted to an upstream end of an inlet filter house 26. The weather hood 24 is fluidly connected to the inlet plenum 22 via an inlet air duct 28. A control system 30 may be provided for controlling any aspect of the gas turbine engine 10. The gas turbine engine 10 may be installed as part of a power plant.

Figure 2:
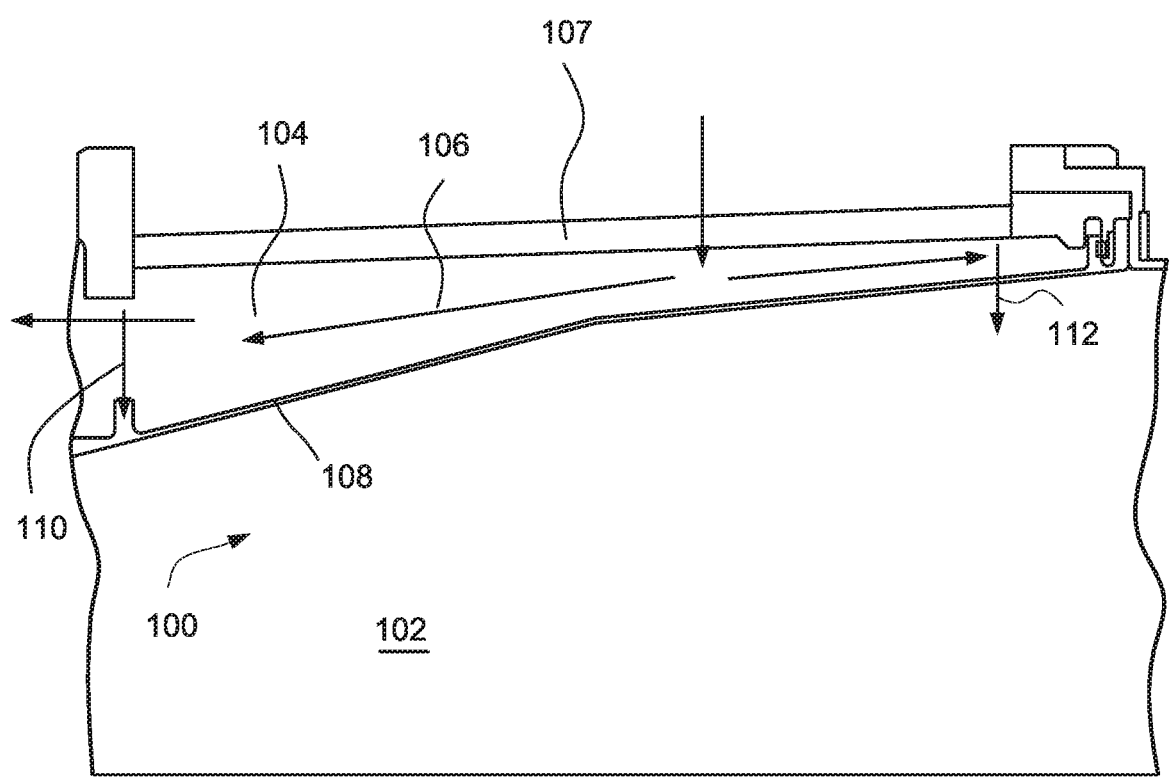
FIG. 2 is a partial cross section of a diffuser in a turbine engine system.

FIG. 2 illustrates a simplified partial cross-section of a diffuser 100 in the gas turbine engine 10. An internal portion 102 of the diffuser 100 allows for the diffuser 100 to convert velocity into pressure, i.e., to perform a diffusion function on the gas stream in the gas turbine engine 10. An external portion 104 of the diffuser 100 provides an area for cooling flow 106. The cooling flow 106 is provided to keep a casing 107 below a maximum operating temperature. For example, the casing 107 may be manufactured from carbon steel that has a maximum acceptable operating temperature of about 600 to 700 degrees Fahrenheit whereas the internal portion 102 may have high temperature combustion gases around 1200 degrees Fahrenheit. The cooling flow 106 may be provided to allow the casing 107 to operate in such operating conditions.

Fluid in the external portion 104 (e.g., the cooling flow 106) may be at a higher pressure than fluid in the internal portion 102 (e.g., combustion gases). For example, the fluid in the external portion 104 may have a pressure between 2 and 3 psi higher than fluid in the internal portion 102. Such a differential pressure will cause fluid to flow from the external portion 104 to the internal portion 102. Indeed, some flow is intentionally provided at a forward dump hole 110 and an aft dump hole 112.

FIG. 3A provides a view towards an outer surface of the diffuser casing 108. As illustrated, the diffuser casing 108 includes a first component 114 (upper component) and a second component 116 (lower component) that come together to form a shell that forms a circumference of the diffuser 100. The diffuser casing also includes a third component 115 (upper component) and a fourth component 117 (lower component). The third component 115 has an end adjacent an end of the first component 114 along a circumferential parting line 119, and an end of the fourth component 117 is adjacent an end of the second component 116 along the circumferential parting line 119. Any number of components can be provided. Four components are described for simplicity. The upper and lower components may each be substantially 180° of a circumferential section of the diffuser 100.

The first component 114 and second component 116 meet at a parting line 118 that extends through the diffuser 108 to the external portion 104 and generally along an axial direction, or axial flow direction, of the gas turbine engine 10. The parting line 118 is illustrated as substantially horizontal, but this should not be considered limiting. Any configuration of parting line 118 is applicable including, for example, circumferential parting lines, vertical parting lines, horizontal parting lines, non-straight parting lines, or combinations thereof. Most of the parting line 118 is not visible in FIG. 3A due to components that form a sealing arrangement 120.

Figure 3B:
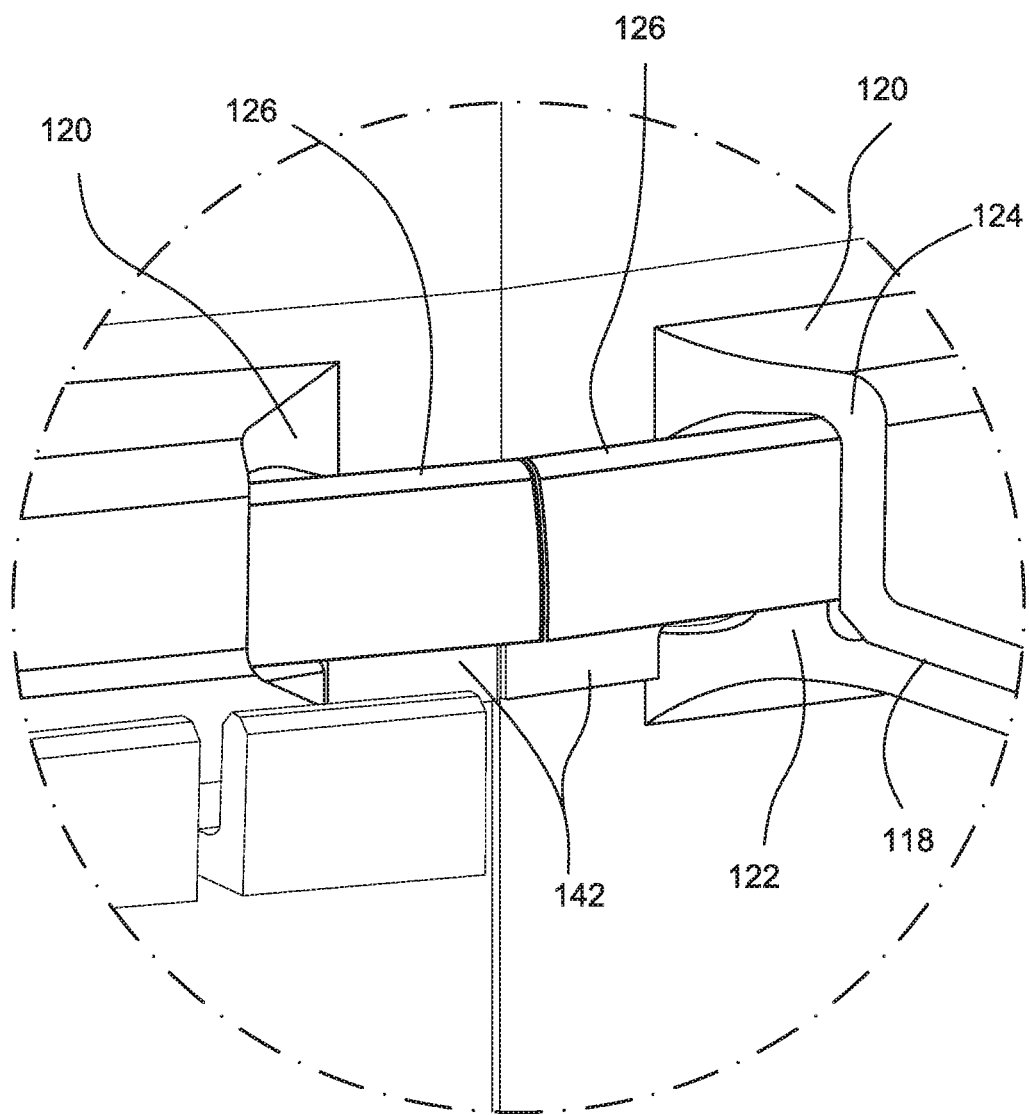
FIG. 3B is a detailed view of a portion of FIG. 3A.

FIG. 3B shows an enlarged view of FIG. 3A and illustrates portions of the sealing arrangement 120. FIG. 3A particularly illustrates two sealing arrangements 120 that are substantially the same and abutted to one another, end to end.

Figure 4:
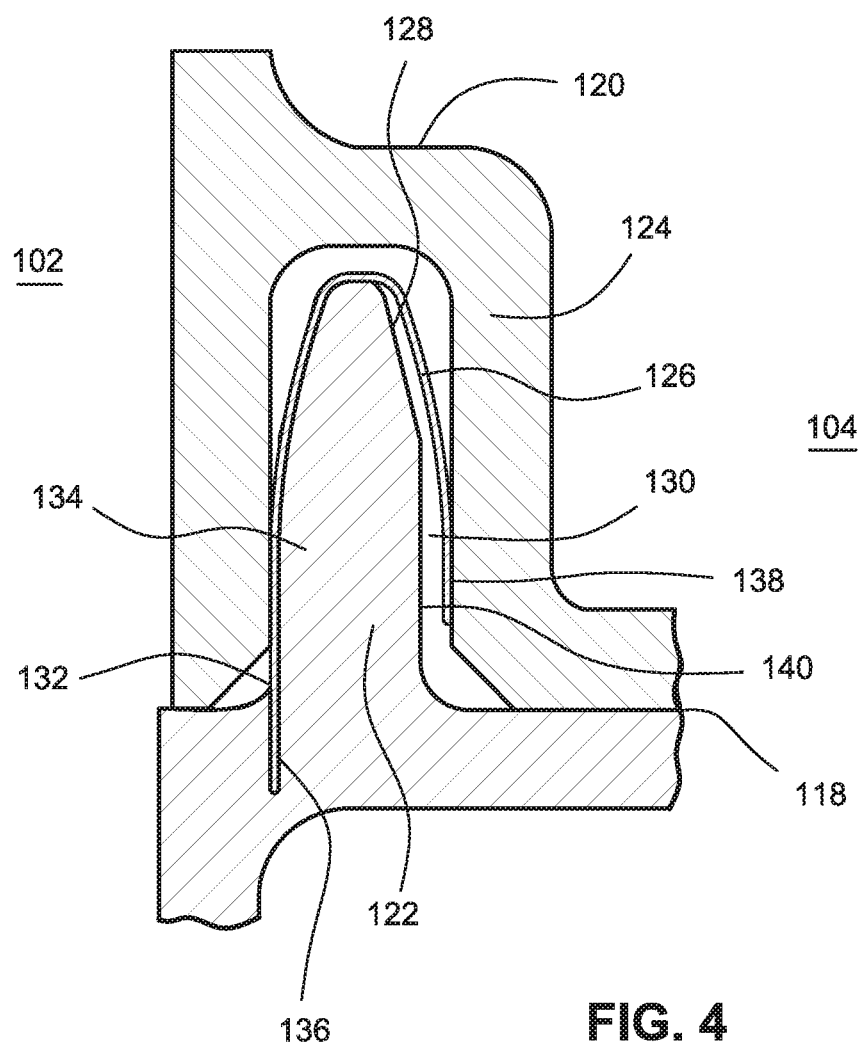
FIG. 4 is a cross-sectional view of a parting line and seal between diffuser components.

FIG. 4 illustrates a cross-section of the sealing arrangement 120. The sealing arrangement 120 includes a protruding portion 122 inserted into a recessed portion 124. A flexible portion 126 is illustrated between the protruding portion 122 and the recessed portion 124. The protruding portion 122 and the recessed portion 124 may be formed on two parts that are substantially mirror images of one another to form a circumferential shell. The protruding portion 122 and recessed portion 124 may be formed from any suitable material. The flexible portion 126 may be made from any suitable material that provides sufficient resiliency and/or spring like effect.

The protruding portion 122 may include an outer surface 128 that may be convex and/or generally V-shaped. The recessed portion 124 may be concave and/or generally U-shaped and/or a fish-mouth shape. The protruding portion 122 may be a tongue and the recessed portion 124 may be a groove. Indeed, the protruding portion 122 and the recessed portion 124 may have any shapes that are complementary to one another and allow for the other aspects of this disclosure. A gap 130 is provided between the protruding portion 122 and the recessed portion 124. The gap 130 may allow for manufacturing tolerance between the protruding portion 122 and the recessed portion 124. The gap 130 may allow for variances between the protruding portion 122 and the recessed portion 124 due to thermal expansion as discussed above. The thermal expansion may be due to, for example, radial thermal expansion of the diffuser 100. The outer surface 128 may be generally complimentary to an interior surface of the flexible portion 126. The gap 130 may be any distance that provides adequate clearance for manufacturing and/or dimensional variance due to thermal loading. In an example, the gap 130 is substantially between 0 and 0.1 inches. In an example, the gap 130 is substantially between 0.020 and 0.080 inches. In an example, the gap 130 is substantially between 0.040 and 0.060 inches. As the protruding portion 122 and the recessed portion 124 thermally expand, the gap 130 may become smaller or larger depending factors such a specific structural configurations and/or temperature gradients.

The sealing arrangement 120 may be provided without the flexible portion 126. Such a configuration provides advantages over a parting line 118 that does not does not include a protruding portion 122 and a recessed portion 124 (a "straight" parting line) in that the complementary configurations of the protruding portion 122 and the recessed portion 124 allow for some dimensional variance due to thermal expansion, or dimensional variation due to other causes, while still providing superior sealing performance to a "straight" parting line because the complementary shapes of the protruding portion 122 and the recessed portion 124 allow for contact to be preserved between the protruding portion 122 and the recessed portion 124, at least to some extent, during thermal expansion and contraction.

The flexible portion 126 has a bent cross-section that may be substantially V-shaped or U-shaped. A first end 132 of the flexible portion 126 may contact the outer surface of the protruding portion 122 at least at one point and is illustrated as contacting the protruding portion all along a first side 134 of the protruding portion 122 that faces the internal portion 102. The flexible portion 126 may be held in place by any suitable means. As illustrated in FIG. 4, the flexible portion 126 is sandwiched between the protruding portion 122 and recessed portion 124 at the first side 134 such that the protruding portion 122 and recessed portion 124 both contact the flexible portion 126. The flexible portion 126 is also illustrated as disposed within a slot or groove 136 in the protruding portion 122. The groove 136 may provide a tight fit (such as a press fit) that resists movement of the flexible portion 126 or may provide a loose fit that allows the flexible portion 126 to slide within the groove 136.

Although the outer surface 128 and the flexible portion 126 have similar shapes, the flexible portion 126 may be a larger V-shape or U-shape such that when the first end 132 is restrained as described above, a second end 138 is biased away from a second side 140 of the protruding portion 122 that faces the external portion 104. The second end 138 may contact an inner surface of the recessed portion 124. With this configuration, the flexible portion 126 spans the gap 130 and provides increased resistance to flow through the parting line 118 when a differential pressure is applied across the parting line 118 from the external portion 104 to the internal portion 102. As the pressure is applied, the pressure applies a force that tends to open or flatten the V-shape or U-shape of the flexible portion 126, or tends to urge the flexible portion 126 into a "less-bent" state, and improves sealing. Also, by contacting the protruding portion 122 and the recessed portion 124 in the manner illustrated and described, the flexible portion 126 is able to flex if the gap 130 has dimensional variances due to manufacturing and/or thermal expansion.

With the flexible portion 126 included, a resultant gap between the flexible portion 126 and the inner surface of the recessed portion 124 and/or the outer surface of the protruding portion 122 may be 0.0 to 0.004 inches, 0.0 to 0.002 inches, or 0.0 to 0.1 inches, or any gap that provides an adequate seal. The flexible portion 126 may flex, expand and/or be compressed to reduce the resultant gap to the greatest extent practicable.

Including the flexible portion 126 provides certain advantages in that the sealing arrangement 120 becomes more deterministic than the sealing arrangement without the flexible portion 126. For example, the ability of the flexible portion 126 to expand and contract (through flexing) during variances caused by thermal expansion allows for a more consistent seal along the parting line 118. Without the flexible portion 126, the ability of the sealing arrangement 120 to seal becomes less predictable and/or less reliable. For example, if the sealing arrangement 120 does not seal as effectively at higher temperatures, more fluid will flow across the parting line 118 due to differential pressure. This can have undesirable effects on a combined cycle efficiency of the turbine because, for example, more cooling fluid enters into the diffuser 100 than is necessary and lowers the combined cycle efficiency. With improved sealing, benefits such as reduced cooling flow, reduced uncertainty in flow predictions, and improved thermal predictions may accrue.

Figure 5:
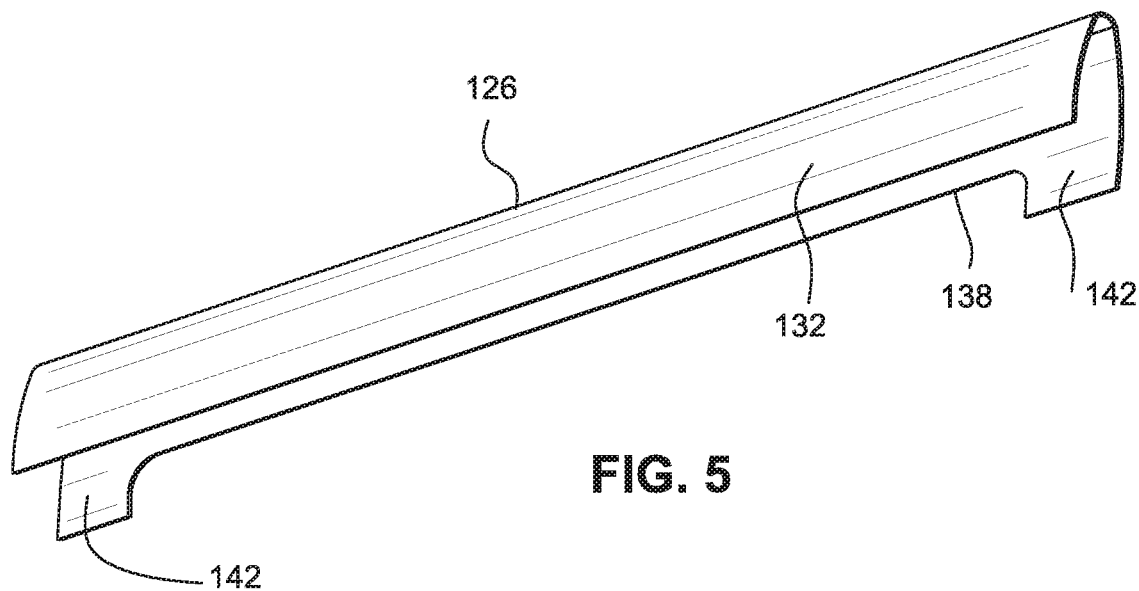
FIG. 5 is an isolated view of a flexible component of the seal.

FIG. 5 illustrates the flexible portion 126 in isolation. Illustrating the flexible, portion 126 in isolation more easily shows an extended blade 142, or extension of the bent cross-section of the flexible portion, that may be provided on one or both ends of the flexible portion 126.

Returning to FIG. 3B, the extended blade 142 may be provided in a location where the protruding portion 122 and the recessed portion 124 are omitted. Due to, for example, manufacturing and/or maintenance concerns, a length of the protruding portion 122 and the recessed portion 124 may be omitted where two substantially similar sealing arrangements 120 abut one another end to end. Also, where a single sealing arrangement 120 comes to an end, the protruding portion 122 and the recessed portion 124 may be omitted. In these scenarios, an extended blade 142 may be provided to ensure that the flexible portion 126 extends sufficiently to cover the parting line 118. As can be seen in FIG. 4, where the extended blade 142 is not included (near the second end 138 in that figure), the parting line 118 is not covered by the flexible member. Where the protruding portion 122 and the recessed portion 124 are included, omitting the extended blade 142 prevents interference while still allowing overall sealing, whereas without the protruding portion 122 and the recessed portion 124, the extended blade 142 does not cause interference but covers the parting line 118 to form a seal.

Although the foregoing description focused on a parting line of a diffuser, the sealing arrangement 120 could be applied to any component with a parting line. Moreover, the parting line could be straight or curved and may be applicable to any seal, and may be particularly useful in situations where variances can occur due to relative motion between components, for example, thermal expansion of components.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

PARTS LIST gas turbine engine 10
inlet system 12
compressor 14
combustion chamber 16
turbine section 18
generator 20
inlet plenum 22
weather hood 24
inlet filter house 26
inlet air duct 28
control system 30
heat recovery steam generator 32
diffuser 100
internal portion 102
external portion 104
cooling flow 106
casing 107
diffuser casing 108
forward dump hole 110
aft dump hole 112
first component 114
second component 116
parting line 118
sealing arrangement 120
protruding portion 122
recessed portion 124
flexible portion 126
outer surface 128
gap 130
first end 132
first side 134
groove 136
second end 138
second side 140
blade 142

What is claimed is:

1. A turbine system comprising:
    a compressor section;
    a combustion section;
    a turbine section;
    a diffuser including:
        a first diffuser component, a second diffuser component and a parting line separating the first diffuser component and the second diffuser component, and
        a third diffuser component and a fourth diffuser component separated by the parting line, wherein the third diffuser component has an end adjacent an end of the first diffuser component and the fourth diffuser component has an end adjacent an end of the second diffuser component; and
    a first seal along the parting line and between the first and second diffuser components, wherein the first seal includes:
        a first recessed portion extending from the first diffuser component,
        a first protruding portion extending from the second diffuser component and inserted into the first recessed portion,
        a first flexible portion disposed between the first protruding portion and the first recessed portion, wherein the first flexible portion has a bent cross-sectional shape when viewed perpendicular to the parting line,
        an outer surface of the first flexible portion contacting an inner surface of the first recessed portion, and
        an inner surface of the first flexible portion contacting an outer surface of the first protruding portion, and
    a second seal along the parting line and between the third and fourth diffuser components, wherein the second seal includes:
        a second recessed portion extending from the third diffuser component;
        a second protruding portion extending from the fourth diffuser component and inserted into the second recessed portion;
        a second flexible portion disposed between the second protruding portion and the second recessed portion, wherein the second flexible portion has a bent cross-sectional shape when viewed perpendicular to the parting line,
        an outer surface of the second flexible portion contacting an inner surface of the second recessed portion, and
        an inner surface of the second flexible portion contacting an outer surface of the second protruding portion, and
    wherein the first recessed portion and the first protruding portion of the first seal are spaced apart from the second recessed portion and the second protruding portion of the second seal by an axial space spanning between the first and third diffuser components;
    wherein the first flexible portion extends beyond the first recessed portion and the first protruding portion into the axial space and terminates at a first end of the first seal, and
    wherein the second flexible portion extends beyond the second recessed portion and the second protruding portion, into the axial space and terminates at a second end of the second seal adjacent the first end of the first seal.

2. The turbine system according to claim 1, wherein the parting line is along an axial direction of the diffuser.

3. The turbine system according to claim 1, wherein the inner surface of the first recessed portion is U shaped.

4. The turbine system according to claim 1, wherein the bent cross-sectional shape of the first flexible portion is V shaped.

5. The turbine system according to claim 1, wherein a portion of the outer surface of the first protruding portion is V-shaped.

6. The turbine system according to claim 1, wherein the first protruding portion is internal to the first recessed portion with a clearance between the first protruding portion and the first recessed portion to allow movement with respect to one another due to thermal expansion.

7. The turbine system according to claim 6, wherein the thermal expansion is due to radial expansion of the diffuser.

8. The turbine system according to claim 1, wherein the first flexible portion seals a clearance between the first protruding portion and the first recessed portion.

9. The turbine system according to claim 1, wherein the bent cross-sectional shape of the first flexible portion is disposed such that differential pressure across the parting line tends to open the bent cross-sectional shape of the first flexible portion towards a less-bent state.

10. The turbine system according to claim 1, wherein the first flexible portion includes an end section positioned in the axial space and a second section between the first recessed portion and the first protruding portion, wherein the end section of the first flexible portion includes a blade which is not included in the second section.

11. The turbine system according to claim 1, wherein the bent cross-sectional shape of the first flexible portion includes a fixed end that is fixed relative to the first protruding portion.

* * * * *